US006907414B1

(12) United States Patent
Parnell

(10) Patent No.: US 6,907,414 B1
(45) Date of Patent: Jun. 14, 2005

(54) HIERARCHICAL INTERFACE TO ATTRIBUTE BASED DATABASE

(75) Inventor: Todd C. Parnell, Austin, TX (US)

(73) Assignee: Trilogy Development Group, Inc., Austin, TX (US)

( * ) Notice: Subject to any disclaimer, the term of this patent is extended or adjusted under 35 U.S.C. 154(b) by 391 days.

(21) Appl. No.: 09/747,008

(22) Filed: Dec. 22, 2000

(51) Int. Cl.$^7$ .............................................. G06F 15/18
(52) U.S. Cl. .............................. 706/47; 706/45; 706/46
(58) Field of Search ..................................... 706/45–60

(56) References Cited

U.S. PATENT DOCUMENTS

| | | | | |
|---|---|---|---|---|
| 4,835,683 A | | 5/1989 | Phillips et al. | 364/200 |
| 5,065,338 A | | 11/1991 | Phillips et al. | 395/51 |
| 6,161,130 A | * | 12/2000 | Horvitz et al. | 709/206 |
| 6,332,163 B1 | * | 12/2001 | Bowman-Amuah | 709/231 |

* cited by examiner

Primary Examiner—Anthony Knight
Assistant Examiner—Michael B. Holmes
(74) Attorney, Agent, or Firm—Hamilton & Terrile, LLP; Kent B. Chambers

(57) ABSTRACT

The present invention provides a hierarchical interface to an attribute based database. The method includes organizing a number of classifiers of data into a hierarchical structure and organizing the data into the hierarchical data structure according to the classifiers to which the data is linked. The hierarchical data structure can be a file system directory tree structure. The files system directory tree structure can be according to the NFS protocol. A request is received from a client, the request formatted according to the NFS protocol. The request is translated into a database query. A result is produced which is formatted according to the NFS protocol and the result is sent to the client. The present invention allows data to be presented in rearrange-able order based on a client view and classifiers, bound and unbound. The present invention also restricts access to files in a flexible manner.

43 Claims, 10 Drawing Sheets

HIERARCHICAL INTERFACE TO ATTRIBUTE BASED DATABASE

BACKGROUND OF THE INVENTION

1. Field of the Invention

The present invention relates to providing access to and accessing a database and more particularly, providing access to and accessing an attribute based database, such as a catalog, using a hierarchical interface, such as a network file system type interface.

2. Description of the Related Art

In modern computer environments, several computer systems are typically connected together to facilitate the sharing of data and files. The interconnected computers, including the hardware and software used to connect them, are known as a network. A network can include any number of computer systems connected together. This connection can be as simple as wires between two computer systems or can be more elaborate, such as a local area network (LAN), a wide area network (WAN), or the Internet.

Each computer system connected in the network can have a different operating system ("OS"). To communicate, the computer systems use standardized procedure primitives for exchanging data over the network, such as Remote Procedure Calls ("RPCs"). To access the contents of another computer system, the requesting computer system, for example, converts a request into a common RPC protocol, such as the well-known Network File System ("NFS") protocol developed by Sun Microsystems, Inc. The NFS protocol was designed to allow different operating systems to share files across networks and allow computers to access files over a network as if they were in local memory. The NFS protocol is compatible across different machines, operating systems, network architectures, and transport protocols.

NFS represents data in a file system as a directory tree structure wherein each branch is a directory containing more directories and files. Branches terminate at directories that contain no sub-directories. The directory structure is represented as a string of directory names representing each level followed by a file name. The typical nomenclature used is: /first_level_directory/second_level_directory/file_A The directory structure can contain any number of directory levels and any number of files. Files can be found at any level of the directory tree structure. The first level directory is typically known as the "root directory." NFS is a common file system abstraction which is recognized by many software applications including word processing programs, email utilities, internet applications, and user specific applications.

A software application that requests data is called a client. The computer system or application that provides data to a client is known as a server. A server can be, for example, known as a "file server" or a "database server" if the server controls access to a file system or a database, respectively. A computer system, which includes software applications executable thereby, can be both a client and a server, depending on the current activity, that is, requesting or providing data. The requested data can be local to the computer system or located on a different computer system connected via the network.

When requesting data from a file system, a client will typically search through several directories, beginning at the root directory, searching for a particular file or set of files. This is accomplished using the NFS protocol, for example, when a client issues a "Read From Directory" procedure. The server responds to the client's request using the NFS protocol by returning the directory entries. The directory entries can be files and/or sub-directories. To search further into the directory tree structure, the client issues another "Read From Directory" procedure, identifying a lower level branch to be searched, one directory at a time. The NFS protocol has many distinct procedures available to perform many different functions. Overall, NFS communicates in terms of directories and files. The data is provided as described above in the form of a directory tree. After requesting and receiving the contents of a directory, further requests from the client can begin at that directory level. The client does not need to start from the root directory for each subsequent request. The NFS protocol allows the client to search different levels of the directory tree through the use of file handles, described herein.

When dealing with a large number of files, the files are often organized in a database, such as a catalog, rather than in a directory structure. If the files are organized in a directory structure, all files can be contained in one directory or organized into several directories. If contained in one directory, a NFS request to "Read From Directory" would return a long list of files which the client would have to search in order to find a particular file or set of files. If organized in a directory tree structure, the client may have to search through many different directories before finding the file or set of files needed.

By organizing the files in a database, a client can request files according to file characteristics or attributes. Databases respond to data requests according to attribute values. This provides the maximum flexibility in searching and organizing the information. For example, data for an Internet based product catalog can include a large number of files, including a graphics file, a product description file, and a cost structure file for each product. The files can be organized according to various attributes including manufacturer, color, item size, season, price, type, etc. A client can structure a request specifying any combination of the various attributes to return a particular file or set of files, such as requesting all graphics files associated with a certain manufacturer or only files for the current season of a certain color. By organizing data in a database, a server can provide flexible queries and reports.

To request data from a database, a query indicating the characteristics or attributes of the requested data must be formulated. SQL (Structured Query Language) is a typical database search language. SQL is a set-oriented language consisting of highly flexible commands that can be used to manipulate information collected in tables such as in a database. SQL was created as a language for databases that adhere to the relational model. The relational model calls for a clear separation of the physical aspects of data from their logical representation. The model removes the details of how the data is stored and makes the access to data purely logical. For example, a file is specified by attributes and not physical size or location in a file system. Using SQL statements, the query specifies the tables, columns and row qualifiers to get to any data item. Many vendors offer SQL products on PCs, superminis, and mainframes. SQL has become the dominant database language of mainframes, minicomputers, and LAN servers.

To access a database, a client must formulate and send a query to the server. In a SQL query, data has attributes, called classifiers, which are set to specific values. Using the product catalog example above, for a particular file the classifier SIZE can be set to CHILDRENS, the classifier COLOR can be set to GREEN, the classifier CATEGORY can be set to CHAIR, and the classifier TYPE can be set to GRAPHICS (SIZE=CHILDRENS, COLOR=GREEN, CATEGORY=CHAR, TYPE=GRAPHICS). Database application specific software on a client that understands the database and the various classifiers formulates the SQL query. The server responds with raw data, typically a record set of all opaque data that meets the classifiers set in the SQL query. To further define the request, for example to add the classifier SEASON=FALL, the client must reformulate the entire SQL query. This method of accessing a database requires clients that access the database to have application specific software that enables them to formulate SQL queries. In addition, a client must typically reformulate an entire query to further define a search.

It is difficult to control access to individual files specified by a database differently for each client. Using the product catalog example above, the database owner might want to allow a specific client to access only a certain set of files, for example, those with the classifier VENDOR having a value of COMPANY A. The database owner can desire to grant access to the entire database to another client. This method of granting different access to different clients is difficult to provide. In a file system environment, access rights can be associated with individual files or directories. However, even in the file system environment, it can be difficult to maintain the provision of different access rights to many clients.

A simpler method is needed to provide clients access to the contents of a database. To provide access to a wide variety of clients, requiring each client to have database application specific software to formulate a query is often not practical. In addition, data and file protections should be easily controlled on a client-by-client basis.

SUMMARY OF THE INVENTION

In one embodiment of the present invention, a method of exporting data from a database is disclosed, wherein the database includes a number of classifiers of data and data linked to at least one of the classifiers. The method includes organizing each of the classifiers into a hierarchical data structure, and organizing the data into the hierarchical data structure according to the classifiers to which the data is linked.

In one embodiment of the present invention, a hierarchical data structure of a database is disclosed, wherein the database includes a number of classifiers of data and data linked to at least one of the classifiers. The hierarchical data structure is generated by organizing each of the classifiers into a hierarchical data structure and organizing the data into the hierarchical data structure according to the classifiers to which the data is linked.

In another embodiment of the present invention, the hierarchical data structure is a file system directory tree structure.

In another embodiment of the present invention, the hierarchical data structure represents only a subset of the classifiers in the database.

In another embodiment, the hierarchical data structure is a file system directory tree structure according to the NFS protocol.

In one embodiment of the present invention, a method of providing a hierarchical interface to an attribute based database is disclosed. The method includes receiving a request in NFS protocol, translating the request into a database query, producing a result that is formatted according to the NFS protocol and sending the result to the client.

In another embodiment, the method further includes providing a file handle to a client upon an initial access request from the client, the file handle corresponding to a view in the database, wherein the view defines an amount of data in the database that is observable by the client.

In another embodiment of the present invention, a system for providing a hierarchical interface to an attribute based database is disclosed. The system includes a data processing system having a memory coupled to at least one processor, wherein the memory comprises instructions for enabling the data processing system to receive a request in NFS protocol, translate the request into a database query, produce a result that is formatted according to the NFS protocol, and send the result to the client.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following is intended to provide a detailed description of an example of the invention and should not be taken to be limiting of the invention itself. Rather, any number of variations may fall within the scope of the invention that is defined in the claims following the description.

Embodiments of the present invention allow a client to access a database as if the database were a file system, representing the data in a hierarchical structure, such as a familiar directory tree structure. Embodiments of the present invention enable a client to access a database without special software or knowledge of the database organization and classifiers. In addition, embodiments of the present invention allow the server to restrict access to specific files on a client-by-client basis.

Figure 6:
FIG. 6 illustrates an example representation of a two dimensional database.

Data is often conveniently stored and organized in a database. Databases often store information as represented in FIG. 6. Databases often require a large amount of memory, and many users often desire access to some or all of the data in a database. Additionally, searching a database in a reasonable amount of time often requires significant processing power and specialized software. For these reasons and others, databases are often stored in a central repository accessible by a server. Clients gain access to the database by communicating to such server. The client may request data import from the client to the server or data export from the server to the client. Users, especially graphical users who interact with a file system such as Microsoft Corporation's Windows Explorer file system, are generally familiar with the organization of information in a tree like structure.

Thus, given that users often want access to data in a database and are generally familiar with hierarchical presentation structures, embodiments of the presentation allow the representation of data and database organizational information via a hierarchical database related data structure such as a file system like tree.

Figure 7A:
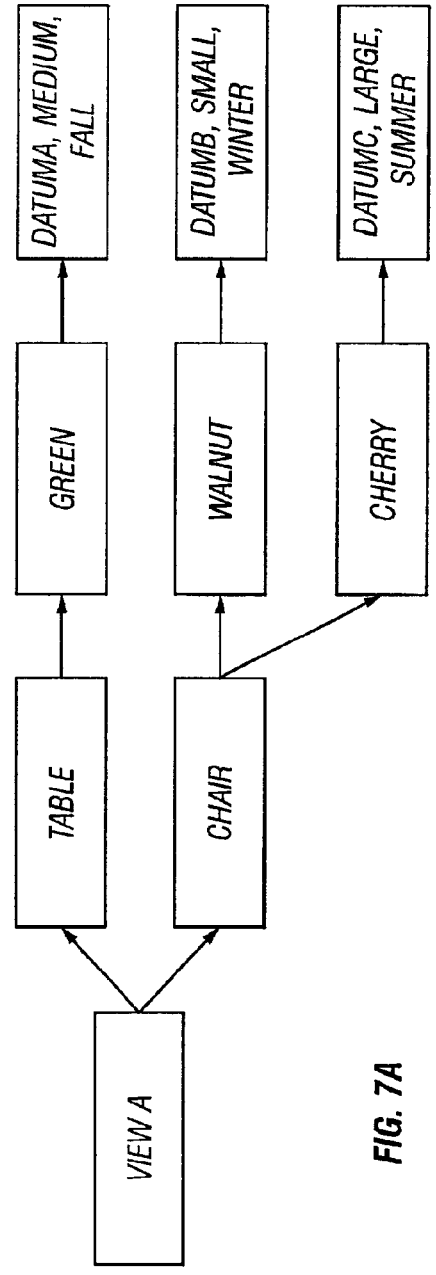
FIGS. 7A–7B illustrate example directory tree structures of a database.
Figure 7B:
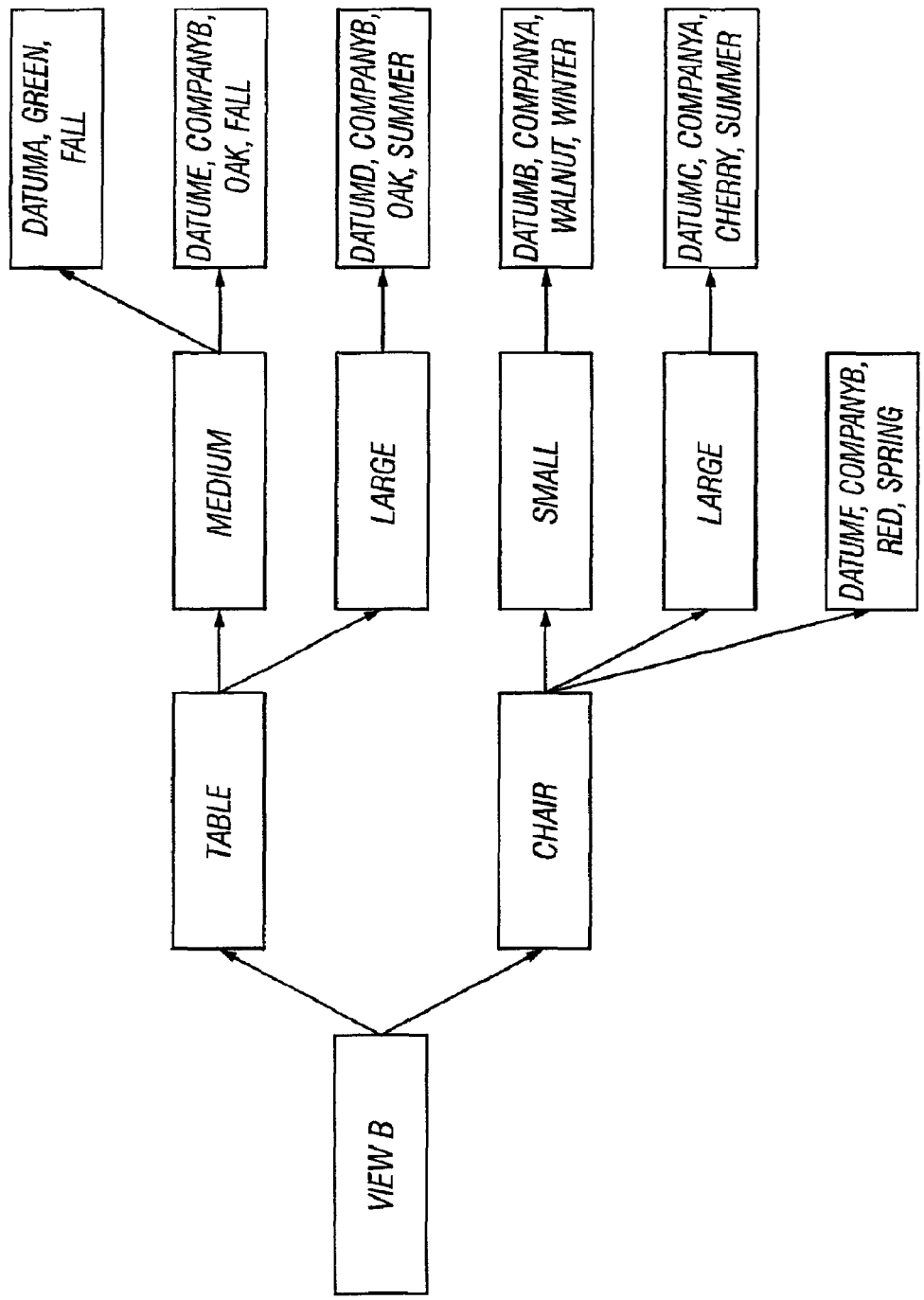

For example, embodiments of the present invention allow users to display the data and database organization of FIG. 6 as the hierarchical data structure of FIGS. 7A–7B. Additionally, embodiments of the present invention allow the user to tailor the hierarchical data related data structure to fit the needs of the user. For example, the user may only want to access data related to for example, company A and their products or all companies but only chairs. Additionally, the computer system exporting the hierarchical database related data structure can restrict access to data for which the user's credentials allow access.

Figure 1:
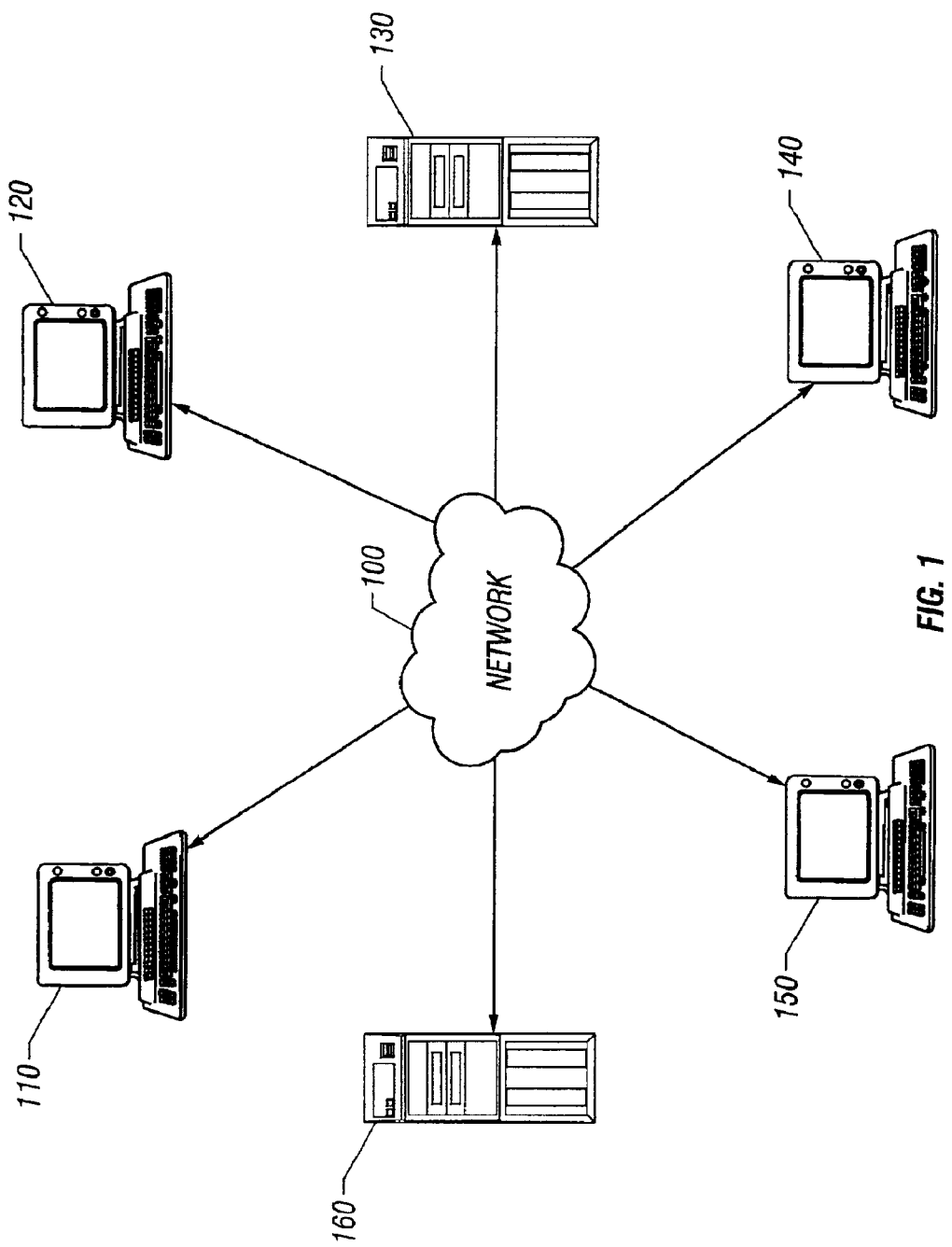
FIG. 1 is a block diagram illustrating a network environment in which embodiments of the present invention may be practiced.

FIG. 1 is a block diagram illustrating a network environment in which embodiments of the present invention can be practiced. As is illustrated in FIG. 1, network 100, such as a private wide area network (WAN), local area network (LAN), or the Internet, allows communication between various computer systems 110–160. The computer systems 110–160 may be clients, servers, or both. For example, computer system 110 may be a client with a terminal and user input and output devices such as a keyboard and monitor and computer system 130 may be a server for the sharing of data amongst some or all computer systems on network 100. Any number of computer systems, both clients and servers, can be connected to network 100. Additionally, individual networks may be interconnected to form super networks.

Computer systems 110–160 can be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems that are designed to provide computing power to one or more users, either locally or remotely. Such a computer system can also include one or a plurality of I/O devices (i.e. peripheral devices) which are coupled to the system processor and which perform specialized functions. Examples of I/O devices include modems, sound and video devices and specialized communication devices. Mass storage devices such as hard disks, CD-ROM drives and magneto-optical drives can also be provided, either as an integrated or peripheral device. One such example computer system is shown in detail in FIG. 11.

Figure 2:
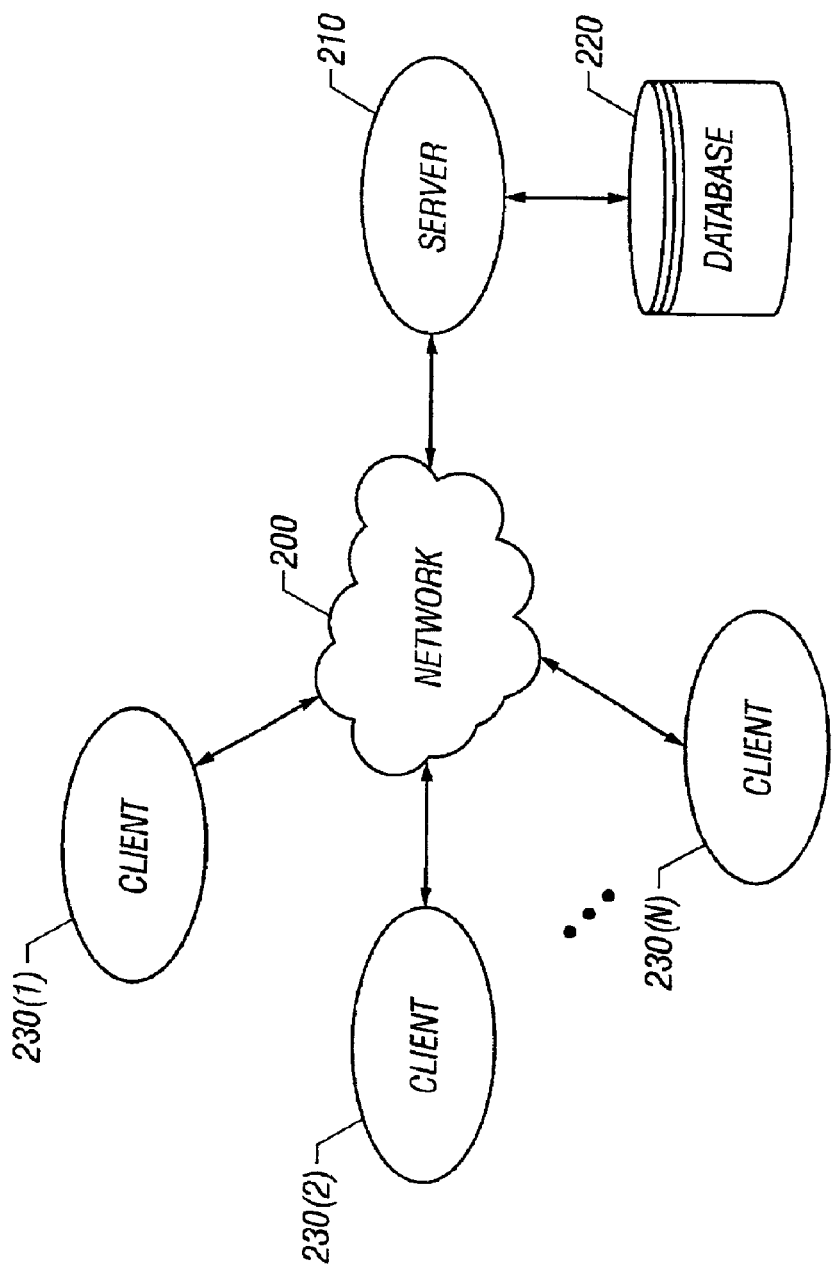
FIG. 2 illustrates the communication link between a client and a server.

FIG. 2 illustrates the communication link between a client and a server. Clients and servers are separate logical entities that work together on a single computer system or between two or more computer systems over a network to accomplish a task. Server 210 services a number of clients 230(1:N) at the same time. Often server 310 performs the task of providing data to clients 230(1:N) across the network 200. The data often resides in one or more databases, such as database 220. "(1:N)" represents 1 through N, and "N" is a variable number. Server 210 regulates clients 230(1:N) access to database 220 and other network resources (not shown). A software application can implement a client, a server, or both types of technology. Thus, servers are useful, for example, for sharing files across a network and for creating shared repositories of documents, images, engineering drawings, and other large data objects.

In a typical communication cycle, client 230(1) requests service from server 210. Client 230(1) typically suspends communication to server 210 until a reply is received from server 210. If accessing a file server, client 230(1) passes parameters to server 210 using a remote call procedure (RPC) such as NFS. If accessing a database server, client 230(1) formulates a database query using, for example, SQL. Client 230(1) formulates a message containing parameters or attribute values and sends the message to server 210. Server 210 receives the message, interprets the parameters, calls the procedure, and sends the reply back to client 230(1). Clients initiate the dialog with a server by requesting a service. Typically, servers passively await requests from the clients.

Figure 3:
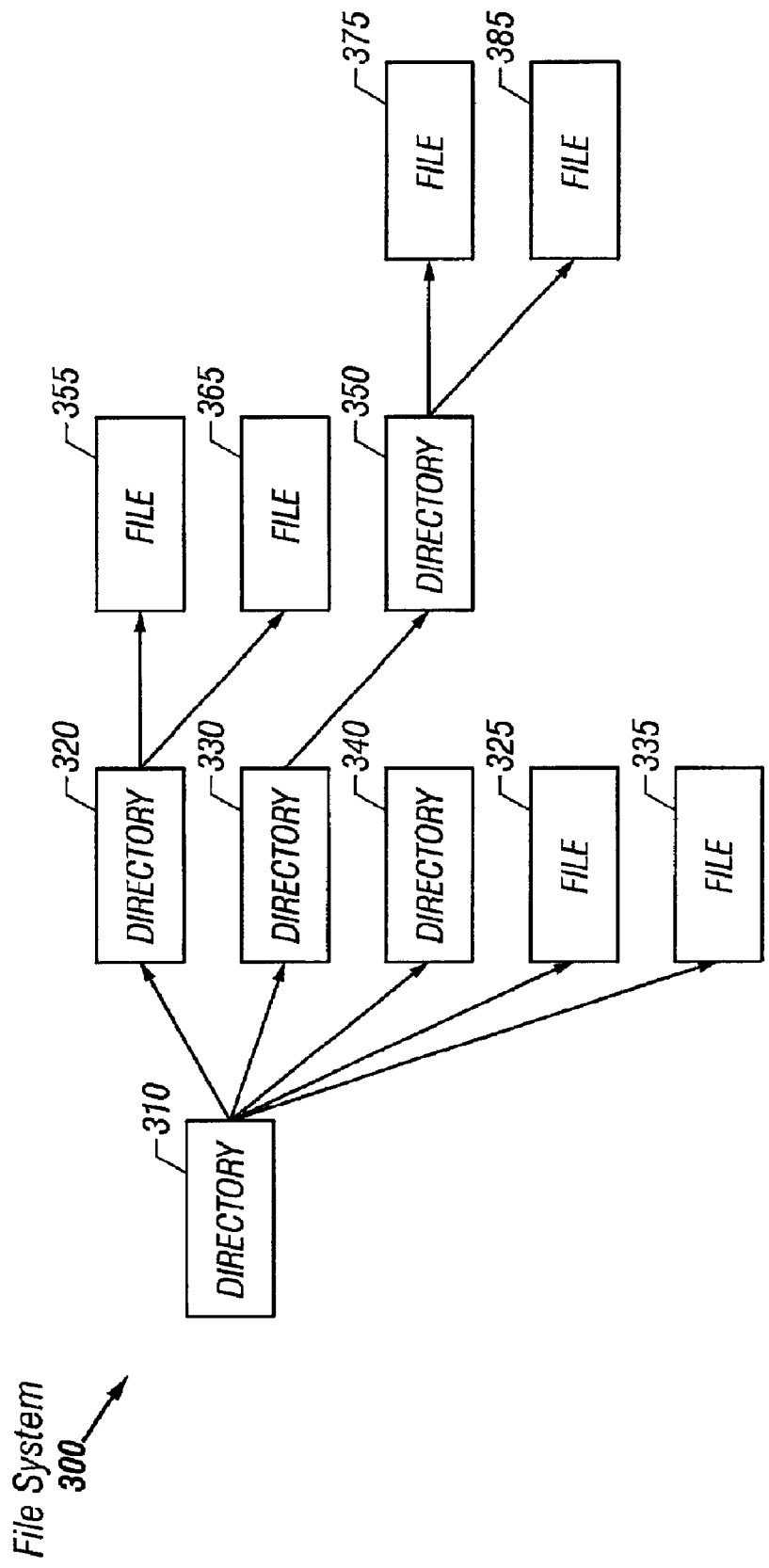
FIG. 3 illustrates the structure of a file system as a directory tree as represented by NFS.

FIG. 3 illustrates the structure of a file system as a directory tree as represented by NFS. The NFS protocol allows a file system on one computing device to be exported to another computing device over a network. A file system, such as file system 300, is represented as a directory tree on a single server (usually a single disk or physical partition) with a specified root directory 310. Some operating systems provide a mount operation to make all file systems appear as a single tree, while others maintain a forest of file systems. NFS assumes a file system is hierarchical with each branch of the hierarchy having any number of sub-branches containing files and/or directories. A file can be any data structure including application programs, graphics files, text documents, service programs, databases, etc. Generally, all branches include a directory with the bottom level empty or consisting of only one or more files.

Referring to FIG. 3, directory 310 can be a root directory, that is, the top level of file system 300 or can be a subdirectory of a higher level directory (not shown). Directory 310 can contain any number of files and directories. Here, directory 310 is shown with branches and sub-branches to two sub-directories, directory 320 and directory 330. Directory 310 also contains three files, file 325, file 335, and file 345. Directory 320 contains two files, file 355 and file 365. File 355 and file 365 are considered as the bottom of the tree branch consisting of directory 310 and directory 320. Directory 330 contains only one directory, directory 340. Directory 340 contains two files, file 375 and file 385. File 375 and file 385 are considered as the bottom of the tree branch consisting of directory 310, directory 330 and directory 340. A directory can be empty, contain only files, or contain only directories. Assuming directory 310 is the root directory, the typical nomenclature used to represent file 375 is file_system_300:/directory_310/directory_330/directory_340/file_375

In the above nomenclature, the file system 300 is typically assigned an OS specific identifier. In DOS or Windows, this is typically a letter, such as "f" and referred to as the "f:drive." In UNIX, this is typically a "mount point."

A client communicating via NFS parses one component of a pathname at a time. For example, a client can request the contents of Directory 310 using the NFS procedure "Read From Directory." The server will respond with a listing of all Directory 310 entries, including Directory 320, Directory 330, File 325, File 335, and File 345. The server can send additional information, including file type, size, date created, etc. The client can then request the contents of Directory 320, and the server responds with a listing of File 355.

The NFS protocol does not define the permission checking used by servers. However, NFS does provide authentication mechanisms so the server can identify which client is making a particular request. Once a client is identified, typically a server does normal operating system permission checking. In the "AUTH_UNIX" model, the server receives the client's UID (User Identification) and GID (Group Identification) on each call and uses them to check permissions. The "AUTH_UNIX" model is defined in NFS protocol description. If the client does not have permission to read directory 310, a request results in either an error message or a listing of no files, e.g., as if the directory were empty.

Locating servers in a network and further locating the files contained therein or accessible thereby is a relatively well-known technique. However, the process is described in some detail here for convenience. It will be recognized by those skilled in the art that there are many ways for computing devices to access files and utilize services over a network.

Figure 4:
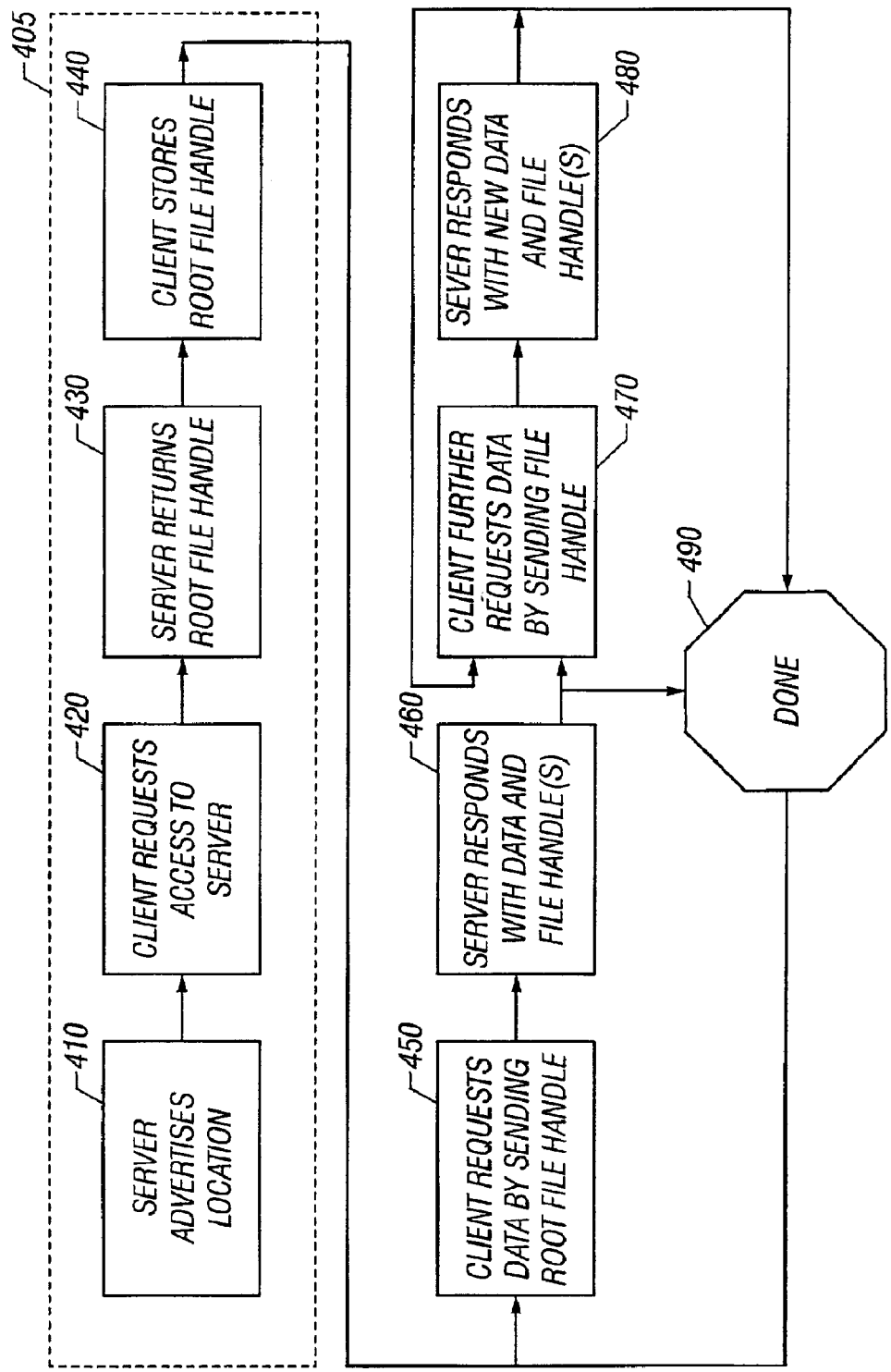
FIG. 4 illustrates the process a client typically performs to search for data on a file server.

FIG. 4 illustrates the process a client typically performs to search for data on a file server. Steps 410 through 440, indicated by box 405, implement the mount protocol. The mount protocol provides operating system specific services including looking up server path names, validating user identity, and checking access permissions. The mount protocol allows a server to hand out remote access privileges to a restricted set of clients. The mount protocol performs the operating system-specific functions that allow, for example, attaching remote directory trees to some local file system.

When the server first starts up, the server typically advertises the logical location, i.e. the network address, and service provided by the server in the network directory (step 410). The network directory tracks available services and resources and their locations. A client can query the network directory for specific services, such as services from available resources like databases, printers, or applications. The client requests to access the server (step 420). After authenticating the client and checking authorizations, the server responds to the client's mount request by returning the location of the resource, identified by the root file handle (step 430). The root file handle identifies the root directory of the resource. Respective file handles are used to identify files and directories on the server's file system. A file handle (also referred to as "fhandle") can contain whatever information the server needs to distinguish an individual file or directory. Clients use the mount protocol to get the root file handle, which allows them entry into the file system of the server. The client stores the root file handle in a cache to use when accessing the server (step 440).

A client only needs to mount the server once. By retaining the root file handle, the client can repeatedly access the server. Once mounted, the server now begins a cycle of receiving and servicing requests from the client.

The client sends a request to the server, for example, requesting the contents of the root directory (step 450). The client sends the root file handle as a parameter of the request. The server responds with requested data (step 460). The server also sends file handles for the files and directories supplied in the response. The "root file handle" refers to the location of the root directory on the server and is used to request information regarding the root directory. A "file handle" refers to the location of the associated file or directory and can refer to any file or directory. File handles, whether or not the "root file handle," are used whenever the client requests service and identifies the particular directory or file the client is interested in. The client does not interpret or decode the file handle. The file handle is an identifier used by the client to access a particular file or directory. The server assigns file handles according to server preferences, such that the file or directory is uniquely identified and is decodable by the server. The client stores the file handles, for example in a cache. The client does not decode the file handle and only uses the file handle to pass the server as a parameter indicating a particular file or directory.

The client requests additional data, for example, the contents of a particular directory (step 470). The client sends the file handle associated with the particular directory. The server responds with new data, that is, the contents of the particular directory, files and directories, and the associated file handles (step 480). After the server has responded with the requested data (step 460 or step 480), the client can start a new data request at the root directory level by returning to requesting data by sending the root file handle (step 450). In addition, after the server responds with new data (step 480), the client can request additional data or search sub-directories (step 470).

Applying the process of FIG. 4 to the file system 300 of FIG. 3, and assuming directory 310 is a root directory, the client begins by requesting to mount the file system 300. After authenticating the client and checking authorizations, the server responds with the root file handle associated with directory 310. The client stores the root file handle and later uses the root file handle to access the contents of directory 310. The client formulates and sends the request and the root file handle to the server. If the request was "Read From Directory," for example, the server responds by providing a list of directory 320, directory 330, file 325, file 335, file 345, their respective file handles, and any other requested information such as file size, type and date created. To formulate and send another request, for example to request the contents of directory 320, the client need only formulate a new request and send the file handle associated with directory 320.

Figure 5:
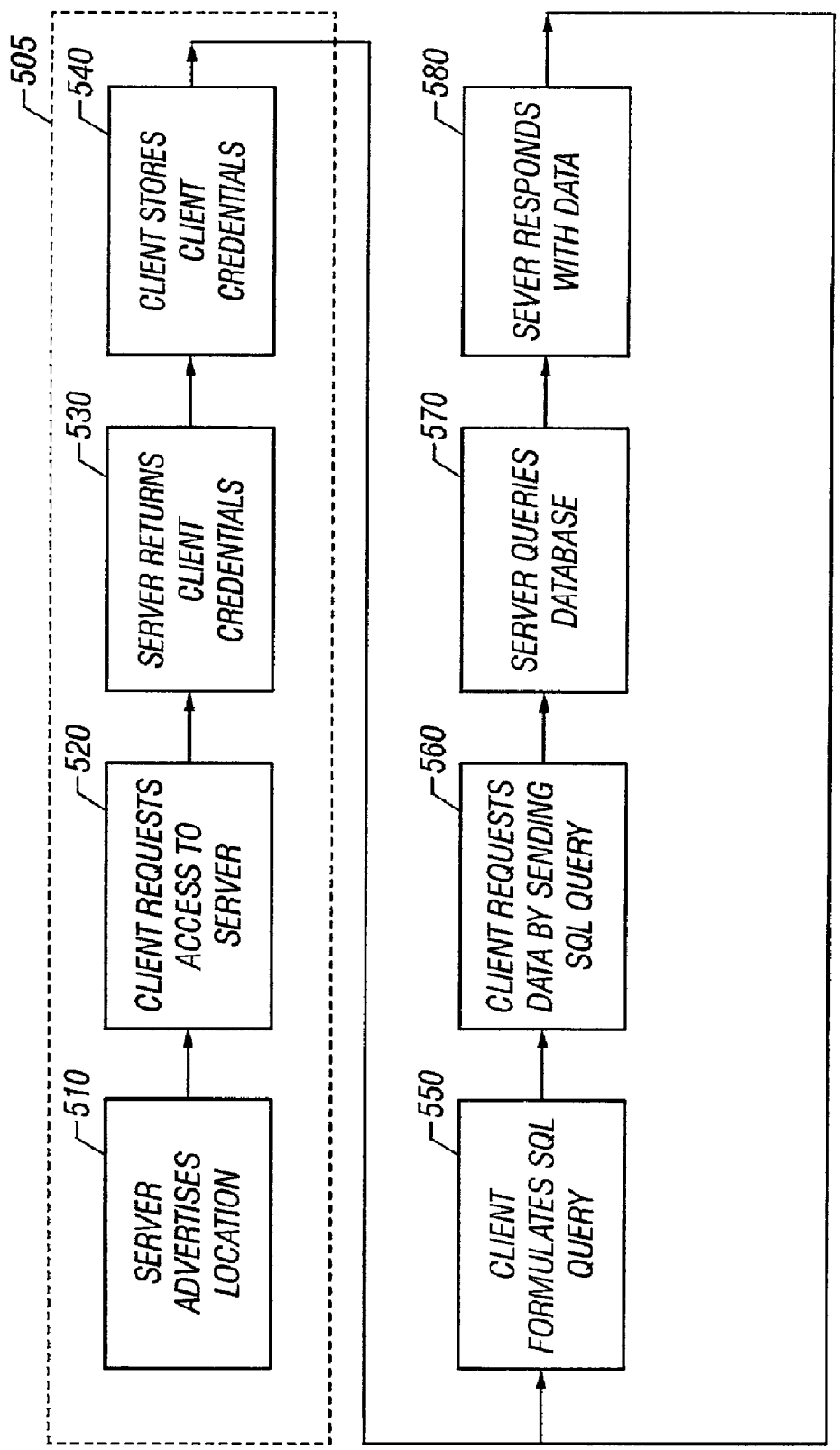
FIG. 5 illustrates the process a client typically performs to access a database on a database server using an SQL query.

FIG. 5 illustrates the process a client typically performs to access a database on a database server using an SQL query. Steps 510–540 are the mount procedure, similar to the mount procedure described in FIG. 4. The client application formulates an SQL query to search for a file or set of files (step 550). The query is formulated by database application specific software, such as the Trilogy Classification Engine ("TCE") software available from Trilogy, Inc. of Austin, Tex., that understands the classifiers of the database. The query formulation can also include user input to set values of the classifiers, such as a user requesting to see all files with a particular attribute. The client requests data and data-related services (such as sorting and filtering) from a database server by sending the SQL query as a message to the database server (step 560). A client application can, with a single SQL statement, retrieve and modify a set of server database records or files. The client must have application code to formulate the query and access the database.

The server queries the database (step 570). The code that processes the SQL request and the data typically resides on the same computer system. The server uses local processing power to find the requested data instead of passing all the records back to a client and then letting the client find the data.

The server responds with the requested data. The results of each SQL query are returned over the network. The database server, also known as the SQL engine, responds to the client's requests and provides secured access to shared data (step 580). The SQL database engine can filter the query result sets, resulting in considerable data communication savings.

The client returns to step 550 for any further queries of the database. The client formulates each query and searches the entire database contents for each request.

FIG. 6 illustrates an example representation of a two dimensional database. A database administrator or other such person creates database 600, organizing data by defining classifiers and assigning values for each datum. A datum identifies a single piece of information and can be a file, a record, or any other piece of data. The datum is referred to as a "blob object," that is, a large chunk of opaque data that the database stores but does not interpret. Each row in database 600 represents a different datum or piece of information. Each column in database 600 represents a different classifier, for example, VENDOR, CATEGORY, COLOR, SIZE, SEASON, and NAME. The classifier for each datum may or may not be assigned a value, as shown for Datum E where the classifier SIZE has the value MEDIUM and for Datum F where the classifier SIZE has a NULL value.

The names of classifiers and the values given in database 600 are used for example purposes only, and are descriptive here but can be completely arbitrary. The database administrator organizes the database according to particular data and client needs. A database can contain one or more tables, such as the one shown in FIG. 6. The number of classifiers and amount of data contained in database 600 are used for example purposes only, and can vary widely in number according to the particular database.

As previously discussed, to access data contained in a database, a client formulates a query. The query requests a listing of all data that have classifiers restricted to specific values. For example, a query of database 600 restricting the classifiers CATEGORY=TABLE and SIZE=MEDIUM returns a listing including Datum A and Datum E. Another query only restricting the classifier SEASON=FALL will return the same results, Datum A and Datum E. Since any number of classifiers can represent the datum, queries on different classifier values can return the same datum. As contrasted to a file system, there is only one way to return a specific datum, that is, by parsing specific directory levels to the specific file. As another example, a query restricting the classifiers CATEGORY=CHAIR and COLOR=OAK returns an empty set since no data meets the requested criteria A query that does not restrict any classifiers to a specific value returns the entire contents of the database.

Users are generally familiar with the organization of information into a hierarchy, such as a file system. Users also often desire to access data in a database. Embodiments of the present invention present data in a database to a user in a hierarchical display. Thus, a hierarchical interface to the database and accessing the database using a hierarchical database increases the usability of the database. For example, embodiments of the present invention allow a client to access a database such as represented by database 600 as if the database were a file system, representing the data in a familiar directory tree structure. The data in database 600, represented as files in a directory tree structure, can be represented in a variety of ways; the ordering of the directories and sub-directories in each branch is variable based on a preselected ordering of classifiers. Two examples of such directory tree structures of database 600 are shown in FIGS. 7A–7B. As illustrated in FIGS. 7A–7B, the entire list of classifiers need not be specified, nor does the specific ordering matter. FIG. 7A shows a subset of the data, in particular, only those that have VENDOR COMPANY A. FIG. 7A shows a larger set of data in a different ordering scheme. Each is a valid method of representing a particular datum. For example, depending on the specified ordering, Datum A can be represented by any of the following nomenclatures:

/company__/table/medium/datum__a
/table/medium/company__a/datum__a
/fall/datum__a Embodiments of the present invention enable a client to access a database without the client having special software or knowledge of the database organization and classifiers. According to embodiments of the present invention, a client can search a database utilizing, for example, the standard NFS protocol. The client need not be aware that the request involves accessing a database nor is there a need for the client to have application specific software to manipulate the database structure or assign any classifiers.

In addition, embodiments of the present invention allow the database server to restrict access to specific files on a client-by-client basis. Thus, data provided from a database using a hierarchical database interface can be provided with improved granularity or precision. This is achieved by providing what is referred to as a "view" for each client. A view is a created environment that defines what data a client sees and how that subset of data is presented to the user. Views restrict some classifiers to a specific value and set an order of viewing classifiers. A classifier restricted to a specific value is referred to as a "bound" classifier. A view with a bound classifier presents only data that meets that restricted value. A classifier not restricted to a specific value is a referred to as an "unbound" classifier. Unbound classifiers in a view set the order of viewing classifiers, presented as a defined order of sub-directories. A view can consist of any number of bound and unbound classifiers. View assignment to a particular client can be stored in a cache, table, database or can be assigned at mount time according to various client characteristics.

A view can be represented by the generic formula given below:

VIEW1: Classifier(1)=Value1(x), Classifier(2)=Value2(y), . . . , Classifier(R)=ValueR(z), Classifier(S), Classifier(S+1), . . . ,Classifier(T)

In View 1, above, classifiers(1:R) are bound, and classifiers(S:T) are unbound. The ordering of bound classifiers in a view is not typically important. The only data viewed has classifier values set to Value1(x), Value2(y), ..., ValueR(z). A view can be extremely restrictive, for example, a client can only observe a small portion of the database, or the view can contain no bound classifiers, allowing the client to observe the entire database. The more classifiers that are bound the more specific the files that are in the response listing.

The ordering of unbound classifiers in a view is typically important. After filtering the data for the bound classifiers, the remaining data is presented in a directory tree structure according to the ordering of the unbound classifiers. For example, in View 1, above, Classifier(S) would represent the first level of directories, Classifier(S+1) would represent the second level of directories (a sub-directory of Classifier(S)), down to the last directory level, represented by Classifier(T). The Classifier would preferably not be the directory, such as TYPE from the database in Table 1. Instead, the directories would be listed as the available values of the classifier, such as TABLE or CHAIR. The directories listed are distinct, that is, if there are more than one occurrence of a specific value for the classifier, the value is only listed once. The client is able to parse the directories defined by the unbound classifiers, seeing only the data defined by the bound classifiers. A view without unbound classifiers is flat and contains no subdirectories. The data is presented as a large list of all files that meet the restricted values of the bound classifiers. If a value of a classifier for a datum is not set or has a NULL value, the datum appears as a file in the directory corresponding to the unbound classifier.

The view for FIG. 7A contains a bound classifier and unbound classifiers. The view for FIG. 7A can be represented as follows:

VIEWA: VENDOR=COMPANYA, CATEGORY, COLOR

The view for FIG. 7B contains only unbound classifiers. The view for FIG. 7B can be represented as follows:

VIEWB: CATEGORY, SIZE

Embodiments of the present invention allow data to be presented in a rearrange-able order based on the particular view and classifiers, bound and unbound. By preventing the client from observing data not meeting bound values, access to files can be restricted via the client view. Views can be assigned on a client-by-client basis, using bound classifiers to restrict access to certain data, allowing access protections to be client specific. Unbound classifiers are used to provide for ease of parsing the data available in the database.

Figure 8:
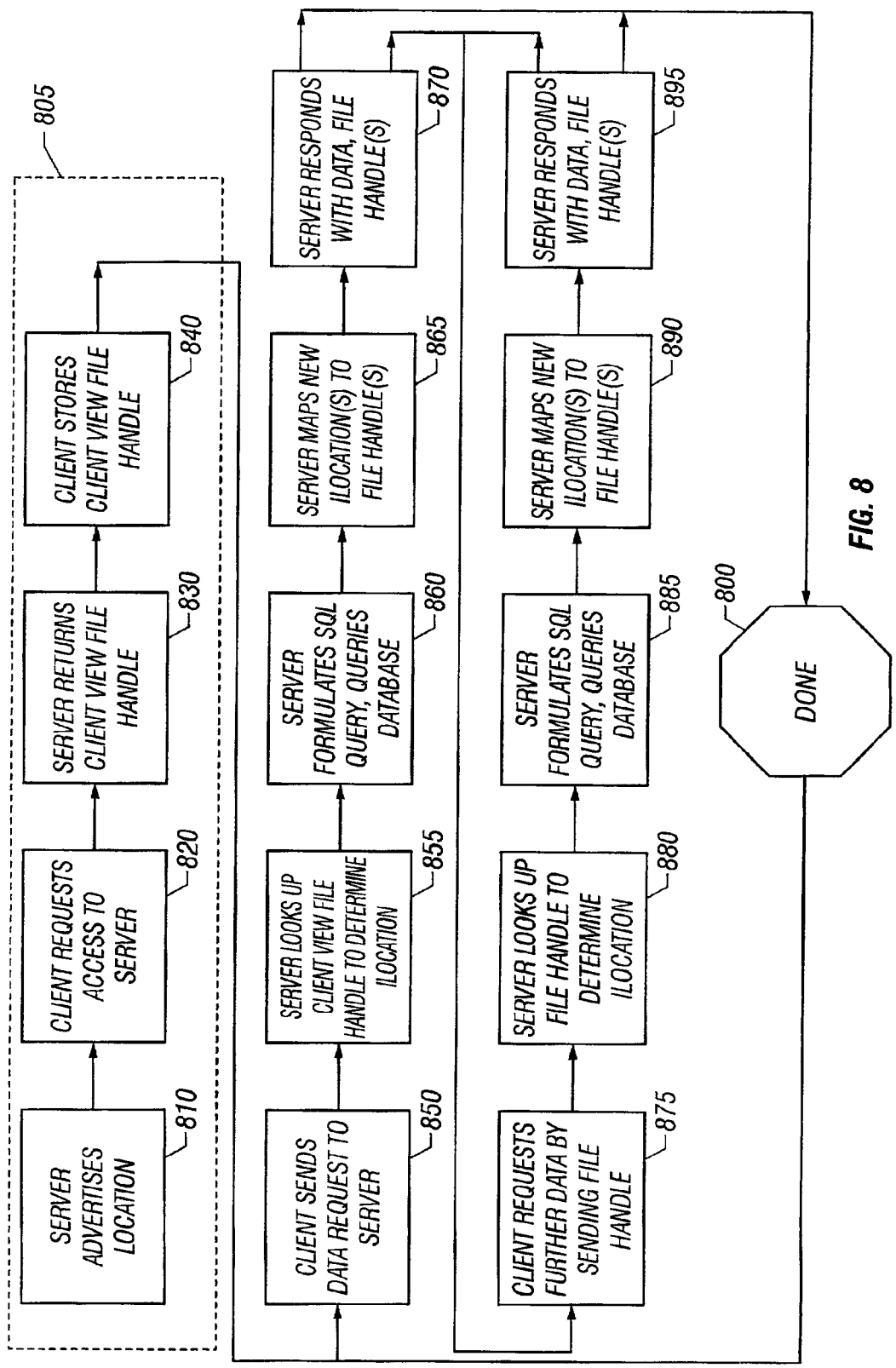
FIG. 8 illustrates the process a client performs to access a database on a server using an NFS representation of the data

FIG. 8 illustrates the process a client performs to access a database on a server using an NFS representation of the data. The process from a client's perspective is similar to the process of FIG. 4, the process a client performs to search for data on a file server.

Steps 810–840 represent the mount protocol. According to the present invention, the mount protocol sets up the client view. When the server first starts up, the server advertises the location and service provided by the server in the network directory (step 810). The client requests to access the server (step 820). After authenticating the client and checking authorizations, the server responds to the client's mount request by returning a view file handle (step 830), which the client stores in a cache (step 840). Views are assigned to clients based on parameters configured by the database administrator. The view, in addition to restricting a client's access to certain data, also sets up the directory structure the client will see. The view file handle is similar to the root file handle in that the client uses the view file handle to access the database on the server and identifies the starting point for searching for data. However, clients can be given a different file handle corresponding to their particular view. In addition, rather than being mapped to the location of the root directory, the view file handle corresponds to an ILocation in the database for the client specific view.

An ILocation is a temporary marker that indicates where in a view a client is currently working. A view is a special kind of ILocation. Views are named Ilocations, which indicate the starting location in a database for the client. Every directory the client sees is a separate ILocation. Note that files do not have associated ILocations. ILocations can be represented similar to views, as a set of zero or more bound classifiers and unbound classifiers. The server maintains an ILocation table, a mapping between ILocations and the file handles sent and received from the client. A client only needs to mount the server once. By retaining the view file handle, the client can repeatedly access the server. Because the view and the directory structure have been defined by the database administrator, when the client passes the view file handle to the server, many file protections are already defined.

The client sends a request to the server, for example, requesting the contents of a directory (step 850). The client sends the view file handle as a parameter of the request. The client need not be aware that the data request involves searching a database. The client formulates all requests according to the NFS protocol. The client receives all responses in the NFS protocol wherein the data is represented as a directory tree structure.

The server looks up the client view file handle in an ILocation table maintained by the server (step 855). The mapping from ILocation to file handle is important since all NFS clients understand file handles, but a database does not. A database understands SQL, which is easily converted to and from an ILocation. Any method of uniquely assigning a mapping from file handle to ILocation, such as a table lookup, is acceptable. As previously mentioned, a file handle is for server use to identify a location, which is given to the client who stores and returns the file handle with requests, but does not interpret the file handle.

Figure 9:
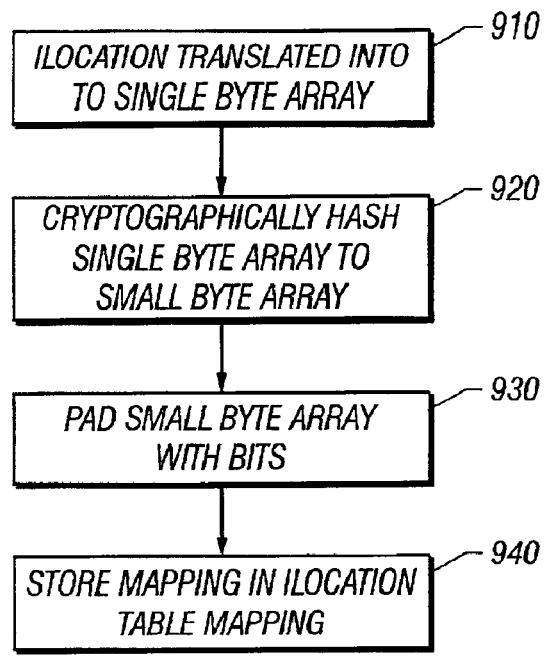
FIG. 9 illustrates the process a server performs to map an ILocation to a file handle.

FIG. 9 illustrates the process a server performs to map an ILocation to a file handle. The mapping from ILocation to file handle is accomplished with the use of cryptographic hash. The server changes the internal representation of an ILocation into a single byte array (string of 1s and 0s) (step 910). Next, the byte is cryptographically hashed (step 920). This yields a small byte array, which is then padded with bits, such as 0s, to make the size of the byte array the size expected for a file handle (step 930). The mapping from ILocation to file handle is stored in a ILocation table maintained by the array (step 940). Files do not have associated ILocations and the server can assign file handles according to server preferences, such that the file is uniquely identified and is decodable by the server.

Cryptographic hash functions are used in various contexts, for example to compute the message digest when making a digital signature. A hash function compresses the bits of a message to a fixed-size hash value in a way that distributes the possible messages evenly among the possible hash values. A cryptographic hash function does this in a way that producing a message that would hash to a particular hash value is difficult. The method of forming a cryptographic hash is well known in the art and is mentioned here as a preferred method of creating a unique mapping from the ILocation to a file handle. The mapping from file handle to ILocation is kept in a table or a database. A table is the preferred method of storing the mappings since they do not need to be retained for long periods of time.

Figure 10:
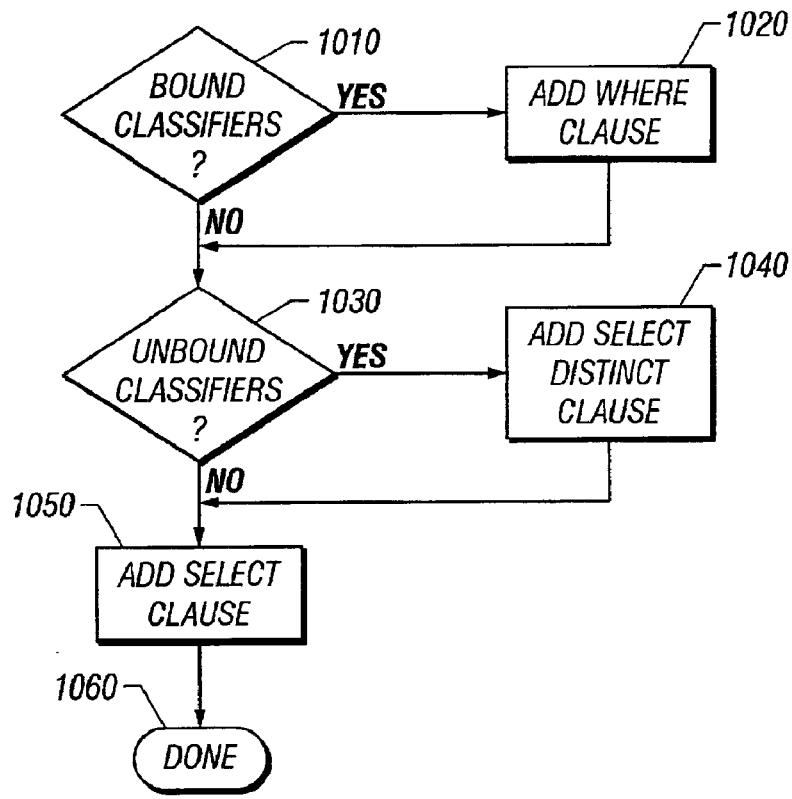
FIG. 10 illustrates the process a server performs to translate an ILocation to an SQL query.

The server formulates an SQL query from the ILocation (step 860). FIG. 10 illustrates the process a server performs to translate an ILocation to an SQL query. To formulate an SQL query, the server must first translate the ILocation to SQL parameter mapping.

Referring to FIG. 10, the server determines if there are bound classifiers (step 1010). The bound classifiers determine the data that the client observes. If there are no bound classifiers, the set of data that the client observes includes the entire database and the server continues to step 1030.

If there are bound classifiers, a WHERE clause in SQL is created for each bound classifier in the ILocation (step 1020). The WHERE keyword in SQL is used to conditionally select data from a table. For the bound classifier CLASSIFIER1=VALUE1, the WHERE clause contains the condition CLASSIFIER1=VALUE1. Multiple bound classifiers cause multiple constraints in an SQL query. After step 1020, the server continues to step 1030.

The server determines if there are unbound classifiers in the ILocation (step 1030). The unbound classifiers define the directory structure of the set of data that the client observes (as defined by the bound classifiers). If there are no unbound classifiers in the ILocation, there are no defined subdirectories in the directory structure, and the server continues to step 1060.

If the ILocation contains unbound classifiers, the subdirectories are defined by the ordering of the unbound classifiers (step 1040). The set of data that the client observes is examined for values of the first unbound classifier by adding a SELECT DISTINCT clause to the query for the classifier. In other words, the clause searches the observable data in the database for a listing of values for the unbound classifier that are defined for some data. The SELECT keyword in SQL produces a result of all available values of the classifier (an available value means that at least one datum in the set has the value). The DISTINCT keyword in SQL, when used with a SELECT clause, eliminates duplicate values in the produced result. The result returned by the database will be represented as a listing of all subdirectories at the level in the directory structure corresponding to the ILocation.

After step 1040, the server goes on to step 1050. The server must find all terminal (non-directory) files (step 1050). This is accomplished by setting the condition of a WHERE clause for the first unbound classifier to NULL. The result returned by the database will be represented as a listing of all files not represented by the subdirectories resulting from step 1040. After step 1050, the server has completed the formulation of the query, step 1070.

If the ILocation contains no unbound classifiers, there are no subdirectories in the directory tree, and the result will produce a listing a files or data that is observable by the client. The keyword SELECT would be used to produce a listing of the names of the files (step 1060). After step 1060, the server has completed the formulation of the query, step 1070. Once the ILocation is translated to an SQL query, the server queries the database.

Referring back to FIG. 8, the server maps the new ILocations corresponding to the directories in the response to file handles (step 865). The server responds to the client with data that is organized into a directory tree structure according to NFS (step 870). The data includes the associated file handles for the files and directories supplied in the response. The directories listed in the response correspond to the first unbound classifier values. The files listed in the response are the data that have the values specified by the bound classifiers that have a NULL value for the first unbound classifier or, if the are no unbound classifiers, the files listed are the entire set of observable data as defined by the bound classifiers.

To view the contents of a directory listed in the response, in step 875 the client requests further data by sending the file handle of the desired directory. In step 880, the server looks up the file handle in the ILocation table. In step 885, the server formulates an SQL query using the method described above and queries the database. After querying the database, in step 890 the server maps the new Location(s) to files handle(s). In Step 895, the server responds to the client with data and file handles for the associated files and directories.

After step 895, the client can request to search further into the directory tree structure by returning to step 875 and requesting further data. After step 870 or step 95, the client may not desire to parse the directory tree structure further and will return to step 850. Step 850 returns the client to requesting data at the top level of a personalized directory tree structure according to the client's view.

There are many advantages to providing a hierarchical interface, such as a directory tree structure, for a database. Many clients already understand file systems and do not need special database software to formulate an SQL query. The directory tree structure allows many applications to present data in a familiar way to many clients. Many different tools are able to access a database without having database specific software. The database is reduced to flexible file system. The present invention, in at least one embodiment, creates an NFS interface with a rearrangeable hierarchy, creating a virtual file system based on a database. In addition, due to the individual client views, the present invention, in at least one embodiment, utilizes NFS to mount whatever file structure the database administrator selects for a particular client. Embodiments of the present invention enable flexible restriction and presentation of data.

Figure 11:
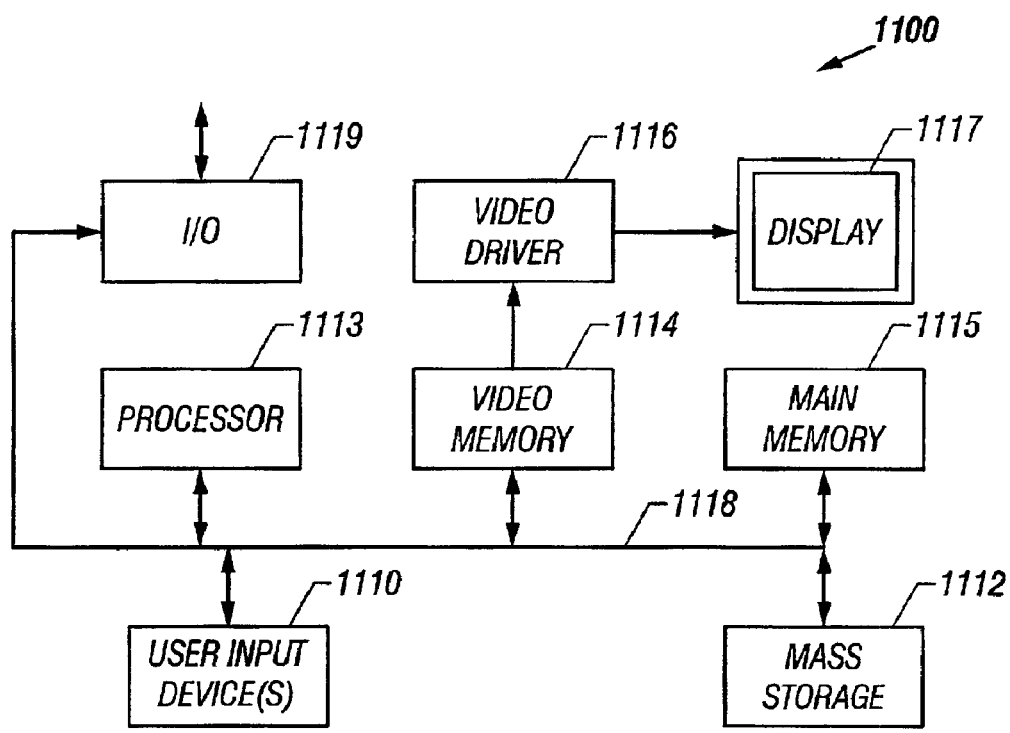
FIG. 11 illustrates a block diagram of a computer system suitable for implementing embodiments of the present invention.

The present invention can be implemented on a computer system such as a general-purpose computer 1100 illustrated in FIG. 11. Input user device(s) 1110, such as a keyboard and/or mouse, are coupled to a bi-directional system bus 1118. The input user device(s) 1110 are for introducing user input to the computer system and communicating that user input to processor 1113. The computer system of FIG. 11 also includes a video memory 1114, main memory 1115 and mass storage 1112, all coupled to bi-directional system bus 1118 along with input user device(s) 1110 and processor 113. The mass storage 1112 may include both fixed and removable media, such as other available mass storage technology. Bus 1118 may contain, for example, 32 address lines for addressing video memory 1114 or main-memory 1115. The system bus 1118 also includes, for example, a 32-bit data bus for transferring data between and among the components, such as processor 1113, main memory 1115, video memory 1114 and mass storage 1112. Alternatively, multiplex data/address lines may be used instead of separate data and address lines.

Computer programs and data are generally stored as instructions and data in mass storage 1112 until loaded into main memory 1115 for execution. Computer programs may also be in the form of electronic signals modulated in accordance with the computer program and data communication technology when transferred via a network. The method and functions relating to the present invention may be implemented in a computer program alone or in conjunction with other configuration technology. Furthermore, context subsystem data structures can be implemented in general-purpose computer 1100 and utilized by general-purpose computer 1100 or by other data processing systems that have access to the data structures.

In one embodiment of this invention, the processor 1113 is a 32-bit microprocessor manufactured by Motorola, such as the 680X0 processor or microprocessor manufactured by Intel, such as the 80X86, or Pentium processor. However, any other suitable microprocessor or microcomputer may be utilized. Main memory 1115 is comprised of dynamic random access memory (DRAM). Video memory 1114 is a dual-ported video random access memory. One port of the video memory 1114 is coupled to video amplifier 1116. The video amplifier 1116 is used to drive the display 1117. Video amplifier 1116 is well known in the art and may be implemented by any suitable means. This circuitry converts pixel data stored in video memory 1114 to a raster signal suitable for use by display 1117. Display 1117 is a type of monitor suitable for displaying graphic images.

The computer system described above is for purposes of example only. The present invention may be implemented in any type of computer system or programming or processing environment. It is contemplated that the present invention might be run on a stand-alone computer system, such as the one described above. The present invention might also be run from a server system that can be accessed by a plurality of client computer systems interconnected over an intranet network. Finally, the present invention may be run from a server that is accessible to clients over the Internet.

Figure 12:
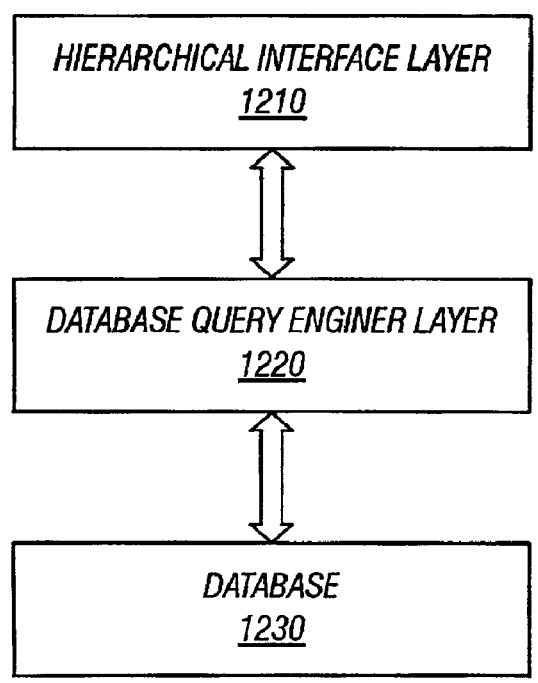
FIG. 12 illustrates a software architecture diagram.

FIG. 12 illustrates a software architecture diagram. A hierarchical interface layer 1210 receives requests from a client. Hierarchical interface layer 1210 accesses a database query engine layer 1220. Database query engine layer 1220 accesses database 1230. Database 1230 returns data.

Hierarchical interface layer 1210 typically performs processes such as those described in FIGS. 8 and 9. The processes performed typically include translating a client request into a request understood by database query engine layer 1220 receiving data from database query engine layer 1220, and translating the received data into a format understood by the client. Database query engine layer 1220 typically performs processes such as those described in FIG. 5. Database query engine layer 1220 is well understood in the art and not discussed in detail here. Database 1230 is typically a repository of data, consisting of one or more tables of data. Database 1230 can be one or more databases, contained on one or more computer systems or servers.

Hierarchical interface layer 1210 provides a client with a hierarchical presentation of the data contained within the database. Hierarchical interface layer 1210 allows the presentation of the hierarchical data to vary per client, such that the hierarchy is tailored to the needs of each client. The client therefore interacts with the database 1230 through hierarchical interface layer 1210, and thus the client does not need to have a database query engine. Hierarchical interface layer 1210 shields the client from query engine layer 1220 such that the client also does not need to understand query languages and classification parameters to access database 1230.

While particular embodiments of the present invention have been shown and described, it will be obvious to those skilled in the art that changes and modifications can be made without departing from this invention in its broader aspects and, therefore, the appended claims are to encompass within their scope all such changes and modifications as fall within the true spirit and scope of this invention.

What is claimed is:

1. A method of providing an interface to a database, wherein the database includes a plurality of nonhierarchically organized classifiers of data and data linked to at least one of the classifiers, the method comprising:

organizing a set of the plurality of nonhierarchically organized classifiers into a first hierarchical data structure according to a view established for a first client; presenting data to the first client according the first hierarchical data structure; organizing a second set of the plurality of classifiers into a second hierarchical data structure according to a view established for a second client; anal presenting data to the second client according the second hierarchical data structure.

2. The method as recited in claim 1, wherein the first hierarchical data structure is a file system directory tree structure.

3. The method as recited in claim 1, wherein the set of the plurality of classifiers contains less than the plurality of classifiers.

4. The method as recited in claim 1, wherein the first hierarchical data structure is a file system directory tree structure according to NFS.

5. A method of presenting data in a database, wherein the database includes nonhierarchically organized classifiers (IM) of data and data linked to at least one of classifiers (1:M), wherein "M" is any positive number including 1, the method comprising: creating a view for a client, wherein the view organizes a set of the non-hierarchically organized classifiers(1:M) into a hierarchical data structure according to characteristics of the client; presenting data to the client according to the hierarchical data structure.

6. The method as recited in claim 5, wherein the hierarchical data structure is a file system directory tree structure.

7. The method as recited in claim 5, wherein the database includes N classifiers and N is a number greater than M.

8. The method as recited in claim 5, wherein the hierarchical data structure is a file system directory tree structure according to NFS.

9. A method of presenting data in a database in a hierarchical data structure, wherein classifiers that classify the data are nonhierarchically organized, the method comprising: receiving a request from a client; translating the request into a database query for data classified by the nonhierarchically organized classifiers; producing a set of data according to the database query, the set of data organized in a hierarchical data structure; and presenting the set of data to the client.

10. The method as recited in claim 9, wherein translating the request into a database query comprises:

looking up the file handle in an ILocation table to obtain an ILocation; and formulating a database query to query a defined set of data, the query formulated from the ILocation.

11. The method as recited in claim 10, wherein Formulating a database query to query a defined set of data comprises:

determining if the ILocation contains bound classifiers, each bound classifier being bound by a constraining value; if the ILocation contains bound classifiers, adding a clause to the database query for each bound classifier in the ILocation, each clause formulated to eliminate data from the defined set of data that has a defined value corresponding to the constraining value of the bound classifier; determining if the ILocation contains unbound classifiers;

if the ILocation contains unbound classifiers, adding a first clause td the database query for the first unbound classifier, the clause formulated to produce a listing of distinct values set for the defined set of data, the distinct values corresponding to the first unbound classifier, and further, adding a second clause to the database query for the first unbound classifier, the second clause formulated to select data from the set of defined data that has the value of the first unbound classifier riot set to a value; and if the ILocation does not contain unbound classifiers, adding a clause to the database query that selects all data in the defined set of data.

12. The method as recited in claim 10, wherein formulating a database query to query a defined set of data includes formulating an SQL query, comprising:

determining if the ILocation contains bound classifiers, each bound classifier being bound by a constraining value; if the ILocation contains bound classifiers, adding a WHERE clause with a condition to the SQL query for each bound classier, wherein the condition of each WHERE clause is set to the constraining value corresponding to each bound classifier; determining if the ILocation contains unbound classifiers; if the ILocation contains unbound classifiers, adding a SELECT DISTINCT clause to the SQL query for the first unbound classifier and further adding a WHERE, clause with a condition to the SQL query for the first unbound classifier, wherein the condition of the WHERE clause is set to NULL; and if the ILocation does not contain unbound classifiers, adding a SELECT clause to the SQL query.

13. The method as recited in claim 9, wherein producing a result using the database query, the result formatted according to the NFS protocol, comprises:

querying the database with the database query that produces ILocations and files; translating the ILocations into unique tile handles; and storing the mapping from the unique file handles to the ILocations in an ILocation table.

14. The method as recited in claim 13, wherein translating the Ilocations into unique file handles comprises:

translating the ILocations into single byte arrays; cryptographically hashing the single bye arrays into small byte arrays; and padding the small byte arrays with bits to make the small byte arrays the proper length of a file handle according to the NFS protocol.

15. The method as recited in claim 9, further comprising providing a file handle to a client upon an initial access request from the client, the file handle corresponding to a view in the database, wherein the view defines an amount of data in the database that is observable by the client.

16. The method as recited in claim 15, wherein the view defines a directory structure observed by the client.

17. A data processing system comprising:

a monitor; a processor coupled to the display; and a memory coupled to the processor, the memory including instructions to cause the processor to graphically display a hierarchy of data classification information, wherein the data classification information represents classifiers of data, the classifiers are nonhierarchically organized in at least one database, the data is contained in the at least one database, the data is at least a portion of all data contained in the at least one database, and each datum is classified by at least one nonhierarchically organized classifier.

18. The data processing system as in claim 17 wherein the hierarchy is selectable.

19. The data processing system as in claim 17 wherein the display is in the form of a directory tree-like display.

20. The data processing system as in claim 17 wherein the database is remotely disposed from a client system, the further comprising:

a graphical display of the data classification information on a display of the client system.

21. The data processing system as in claim 17 further comprising:

an active link associated with each classifier represented by the data classification information that allows display of the data that is associated with each classifier.

22. A method of providing hierarchical data classification information, the method comprising:

receiving a request for hierarchical data classification information, wherein the data classification information represents classifiers of data, the classifiers are nonhierarchically organized in at least one database, the data is contained in the at least one database, the data is at least a portion of all data contained in the at least one database, and each datum is classified by at least one classifier; generating the hierarchical database classification information; and providing the hierarchical database classification information.

23. The method of providing hierarchical data classification information as in claim 22, wherein generating the hierarchical database classification information comprises: translating the request into a database query; and producing a set of data according to the database query, the set of data organized in a, hierarchical data structure.

24. The method of providing hierarchical data classification information as in claim 23, wherein translating the request into a database query comprises:

looking up a file handle in an ILocation table to obtain an ILocation; and formulating a database query to query a defined set of data, the query formulated from the Location.

25. The method of providing hierarchical data classification information as in claim 22, wherein providing the hierarchical database classification information further comprises:

providing the hierarchical database classification information in the form of a directory tree-like structure.

26. The method of providing hierarchical data classification information as in claim 22, wherein providing the hierarchical database classification information further comprises:

providing the hierarchical database classification information from a server system; the method further comprising: displaying the hierarchical database classification information with a client system.

27. A computer readable medium having stored thereon a hierarchical data structure of classifiers of a database, wherein the classifiers include nonhierarehically organized classifiers(1:M) of data and data linked to the at least one of the classifiers(1:M), wherein M is any positive number including 1, the hierarchical data structure generated by the method of creating a view for a client, wherein the view organizes a set of the nonhierarchically organized classifiers (1:M) into a hierarchical data structure according to characteristics of the client; and organizing data into the hierarchical data structure according to the set of the classifiers (1:M).

28. The computer readable medium as recited in claim 27, wherein the hierarchical data structure is a file system directory tree structure.

29. The computer readable medium as recited in claim 27, wherein the database includes N classifiers and N is a number greater than M.

30. The computer readable medium as recited in claim 27, wherein the hierarchical data structure is a file system directory tree structure according to NPS.

31. A computer readable medium for providing an interface to a database, wherein the database includes nonhierarchically organized classifiers(1:M) of data and data linked to at least one of classifiers(1:M), wherein "M" is any positive number including 1, the computer readable medium comprising a set of instructions for enabling a computer system to:

organize a set of the nonhierarchically organized classifiers(1:M) into a first hierarchical data structure according to a view established for a first client; present data to the first client according the first hierarchical data structure; organize a second set of the nonhierarchically organized classifiers(1:M) into a second hierarchical data structure according to a view established for a second client; and present data to the second client according the second hierarchical data structure.

32. The computer readable medium as recited in claim 31, wherein the first hierarchical data structure is a file system directory tree structure.

33. The computer readable medium as recited in claim 31, wherein the database includes N classifiers and N is a number greater than M.

34. The computer readable medium as recited in claim 31, wherein the hierarchical data structure is a file system directory tree structure according to NFS.

35. The computer readable medium of claim 31 wherein the computer readable medium is selected from the group comprising: a hard disk drive, optical drive, floppy disk drive, compact disk, or electronic signals representing the instructions.

36. An apparatus for providing an interface to a database, wherein the database includes nonhierarchically organized classifiers(1:M) of data and data linked to at least one of the classifiers(1:M), wherein "M" is any positive number including 1, the apparatus comprising:

means for organizing a set of the nonhierarchically organized classifiers(1:M) into a first hierarchical data structure according to a view established for a first client; means for presenting data to the first client according the first hierarchical data structure; means for organizing a second set of the nonhierarchically organized classifiers(1:M) into a second hierarchical data structure according to a view established for a second client; and means for presenting data to the second client according the second hierarchical data structure.

37. The computer readable medium as recited in claim 36, wherein the first hierarchical data structure is a file system directory tree structure.

38. The computer readable medium as recited in claim 36, wherein the database includes N classifiers and N is a number greater than M.

39. The computer readable medium as recited in claim 36, wherein the hierarchical data structure is a file system directory tree structure according to NFS.

40. A system for providing an interface to a database, wherein the database includes nonhierarchically organized classifiers(1:M) of data and data linked to at least one of the classifiers(1:M), wherein "M" is any positive number including 1, the system comprising:

a data processing system having a memory coupled to at least one processor, wherein the memory comprises instructions far enabling the data processing system to: organize a set of the nonhierarchically organized classifiers(1:M) into a first hierarchical data structure according to a view established for a first client; present data to the first client according the first hierarchical data structure; organize a second set of the nonhierarchically organized classifiers(1:M) into a second hierarchical data structure according to a view established for a second client; and present data to the second client according the second hierarchical data structure.

41. The computer readable medium as recited in claim 40, wherein the first hierarchical data structure is a file system directory tree structure.

42. The computer readable medium as recited in claim 40, wherein the database includes N classifiers and N is a number greater than M.

43. The computer readable medium as recited in claim 40, wherein the hierarchical data structure is a file system directory tree structure according to NFS.

* * * * *